(12) United States Patent
Sandberg et al.

(10) Patent No.: US 7,993,126 B2
(45) Date of Patent: Aug. 9, 2011

(54) ADAPTER SYSTEM FOR MOLD PLATE ATTACHMENT TO PATTY-FORMING MACHINE

(75) Inventors: Glenn Sandberg, New Lenox, IL (US); Paul Taylor, Munster, IN (US)

(73) Assignee: Formax, Inc, Mokena, IL (US)

( * ) Notice: Subject to any disclaimer, the term of this patent is extended or adjusted under 35 U.S.C. 154(b) by 719 days.

(21) Appl. No.: 12/009,325

(22) Filed: Jan. 17, 2008

(65) Prior Publication Data
US 2008/0233230 A1    Sep. 25, 2008

Related U.S. Application Data

(60) Provisional application No. 60/881,410, filed on Jan. 19, 2007.

(51) Int. Cl.
*B28B 17/00* (2006.01)
(52) U.S. Cl. ............... 425/186; 425/185; 425/192 R; 426/512; 426/513
(58) Field of Classification Search .......... 425/572, 425/185, 186, 192 R; 264/328.8, 328.12; 426/512, 513
See application file for complete search history.

(56) References Cited

U.S. PATENT DOCUMENTS

| | | | |
|---|---|---|---|
| 3,887,964 A | 6/1975 | Richards et al. | |
| RE30,096 E | 9/1979 | Richards | |
| 4,182,003 A | 1/1980 | Lamartino et al. | |
| 4,356,595 A | 11/1982 | Sandberg et al. | |
| 4,372,008 A | 2/1983 | Sandberg | |
| 4,416,604 A * | 11/1983 | Bender et al. | 425/183 |
| 4,821,376 A | 4/1989 | Sandberg | |
| 4,996,743 A | 3/1991 | Janssen | |
| 6,592,359 B2 * | 7/2003 | Kennedy et al. | 425/572 |

OTHER PUBLICATIONS

VEMAG, "Forming machine 250", 2004, pp. 1-2, Germany.

* cited by examiner

*Primary Examiner* — Maria Veronica D Ewald
(74) *Attorney, Agent, or Firm* — Erickson Law Group, PC

(57) ABSTRACT

Apparatus and methods of modify a reciprocating mold plate patty-forming machine such that a mold plate for a smaller machine can be fit into a larger forming machine. A tooling set for the modification includes a dedicated drawbar configured to mount the smaller mold plate and modified wider spacers to closely meet the smaller mold plate within the forming machine. An adapter system selectively mounts either a first mold plate having a first set of keyholes or a second mold plate having a second set of keyholes, different than the first set of keyholes to a single reciprocating mold plate patty-forming machine. The adapter system can include first and second sets of adapters and a drawbar having provision for connection at opposite ends to driving rods of the drive system. The first set of adapters have keys corresponding to the first set of keyholes, and the second set of adapters having keys corresponding to the second set of keyholes, the first and second set of adapters being selectively attached to the drawbar.

14 Claims, 13 Drawing Sheets

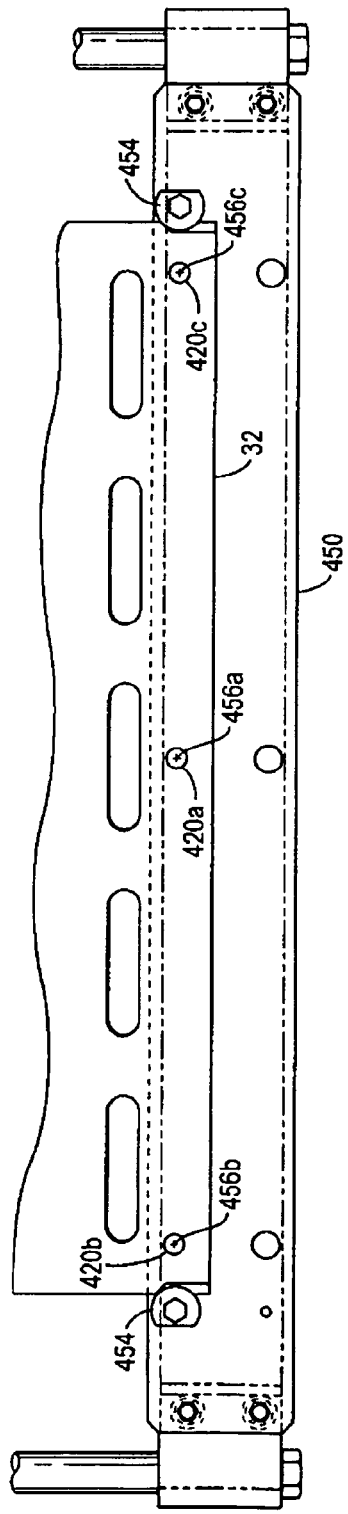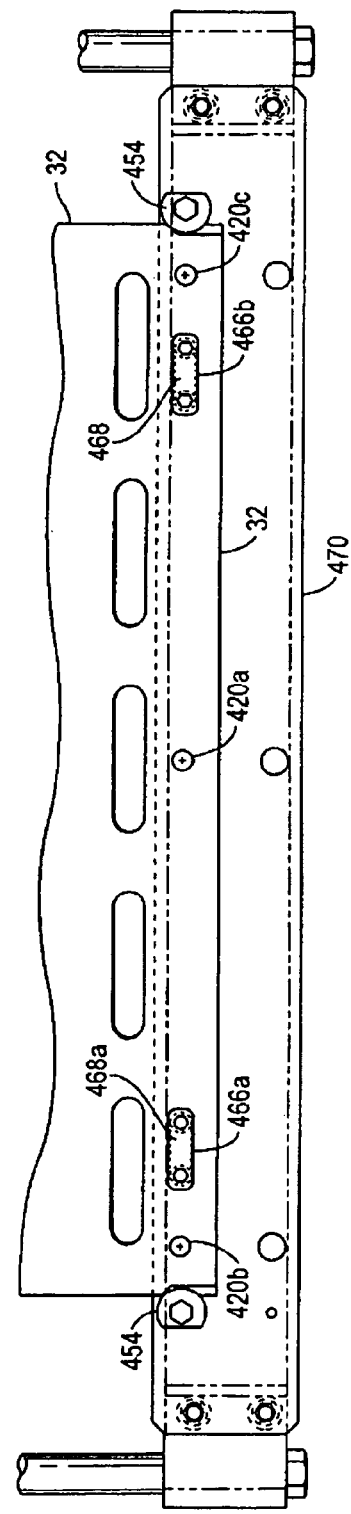
FIG. 7
FIG. 8

ADAPTER SYSTEM FOR MOLD PLATE ATTACHMENT TO PATTY-FORMING MACHINE

This application claims the benefit of Provisional Application U.S. Ser. No. 60/881,410 filed Jan. 19, 2007.

BACKGROUND OF THE INVENTION

Use of pre-processed foods, both in homes and in restaurants, has created a demand for effective high-capacity automated food processing equipment. That demand is particularly evident with respect to hamburgers, molded steaks, fish cakes, and other molded food patties.

Food processors utilize high-speed molding machines, such as FORMAX®, MAXUM700®, F-6™, F-12™, F-19™, F-26™, or F-400™ reciprocating mold plate forming machine, available from Formax, Inc. of Mokena, Ill., U.S.A., for supplying patties to the fast food industry. High-speed molding machines are also described for example in U.S. Pat. Nos. 3,887,964; 4,372,008; 4,356,595; 4,821,376; 4,996,743, and published U.S. Patent Application 2005/0092187, U.S. Ser. No. 10/942,627 filed Sep. 16, 2004.

The FORMAX® F-26™ reciprocating mold plate forming machine has enjoyed widespread commercial success for over 35 years. A typical FORMAX® F-26™ molding machine can operate at 90 strokes per minute and produce about 32,400 patties per hour based on the standard width mold plate for the F-26™ which is about 27 inches wide and can include 6 mold cavities.

The mold plate for the FORMAX® F-26™ is mounted to the reciprocating driving mechanism by being keyed to a drawbar that is driven at opposite ends by the longitudinally reciprocating drive rods of the driving mechanism. The mold plate includes three spaced apart cylindrical holes that receive pins that are fixed to the drawbar. Side locks or cams rotate to overlie side recesses formed in the mold plate.

The FORMAX® MAXUM700® reciprocating mold plate patty forming machine was introduced in 2003. It is a larger machine that can operate at 120 strokes per minute and produce about 43,200 patties per hour based on the standard width mold plate for the MAXUM700® which is about 28.5 inches.

The mold plate for the FORMAX® MAXUM700® is also mounted to the reciprocating driving mechanism by being keyed to a drawbar that is driven at opposite ends by the longitudinally reciprocating drive rods of the driving mechanism. The mold plate includes two spaced apart oblong holes that receive oblong pins that are fixed to the drawbar. Side locks or cams rotate to overlie side recesses formed in the mold plate.

Due to the difference in lateral dimensions between the F-26™ and MAXUM700® mold plates and the difference in the shape and number of keys, the F-26™ mold plates are not currently compatible with the MAXUM700® forming machine.

A processing plant can be set up to run molding machines to mold patties of variable selected thickness, shape or food material content. Accordingly, the processing plant may already have an assortment of F-26™ mold plates to be fit into the F-26™ patty-forming machine. Currently, if the processing plant wishes to replace the F-26™ with a MAXUM700® machine, the F-26™ mold plates are not compatible. Additionally, some processing plants may wish to upgrade from one or more F-26™ machines to one or more MAXUM700® machines, or run a combination of F-26™ and MAXUM700® machines.

The present inventors have recognized that it would be desirable for a user of the MAXUM700® patty-forming to be able to reuse F-26™ mold plates, which the user may already have in inventory because of prior use of the F-26™ machine, in a MAXUM700® machine.

The present inventors have recognized that it would be desirable for a user of the MAXUM700® patty-forming machine to be able to use F-26™ mold plates, which the user already has in inventory because of current use of the F-26™ machine, interchangeably in a MAXUM700® machine.

SUMMARY OF THE INVENTION

The present invention set forth different apparatus and methods of modifying a reciprocating mold plate patty-forming machine such that a mold plate for a smaller machine can be fit into a larger forming machine. According to one aspect, a tooling set for the modification includes a dedicated drawbar configured to mount the smaller mold plate and modified wider spacers to closely meet the smaller mold plate within the forming machine. According to another aspect, the smaller mold plate is reworked to include a key pattern identical to or similar to the key pattern of the mold plate for the larger forming machine, and wider spacers are also provided.

According to the preferred embodiment of the present invention, an adapter system selectively mounts either a first mold plate having a first set of keyholes or a second mold plate having a second set of keyholes, different than the first set of keyholes to a single reciprocating mold plate patty-forming machine. The adapter system can include first and second sets of adapters and a drawbar having provision for connection at opposite ends to driving rods of the drive system. The first set of adapters have keys corresponding to the first set of keyholes, and the second set of adapters having keys corresponding to the second set of keyholes, the first and second set of adapters being selectively attached to the drawbar.

The present invention provides a method of modifying a reciprocating mold plate patty-forming machine of the type having a drawbar for connecting a mold plate and a drive mechanism connected to the drawbar for reciprocating the drawbar, for mounting either a first mold plate having a first width or a second mold plate having a smaller second width. The present invention provides a method of modifying a reciprocating mold plate patty-forming machine wherein the first mold plate comprises plural keyholes in a first pattern and the second mold plate comprises plural keyholes in a different second pattern, and wherein the mold plate forming machine comprises side spacers that closely meet the side edges of the first mold plate.

The inventive method includes the steps of: providing a first drawbar for the first mold plate and a second drawbar for the second mold plate, the first drawbar having first keys that correspond to the first pattern and the second drawbar having second keys corresponding to the second pattern; and providing replacement side spacers that have a width to closely meet the side edges of the second mold plate.

Preferably, the first and second drawbar comprise a common bar member, wherein the first drawbar comprises at least one adapter having the first keys, the adapter connectable to the common bar member.

Preferably, the second drawbar comprises at least one second adapter having the second keys, the second adapter connectable to the common bar member.

Numerous other advantages and features of the present invention will be become readily apparent from the following

BRIEF DESCRIPTION OF THE DRAWINGS

FIG. 7 is a plan view of a first system for converting a first mold plate to be usable with the second patty-forming machine of FIGS. 3-4;

FIG. 8 is a plan view of a second system for converting a first mold plate to be usable with the second patty-forming machine of FIGS. 3-4;

DETAILED DESCRIPTION OF THE PREFERRED EMBODIMENTS

Figure 1:
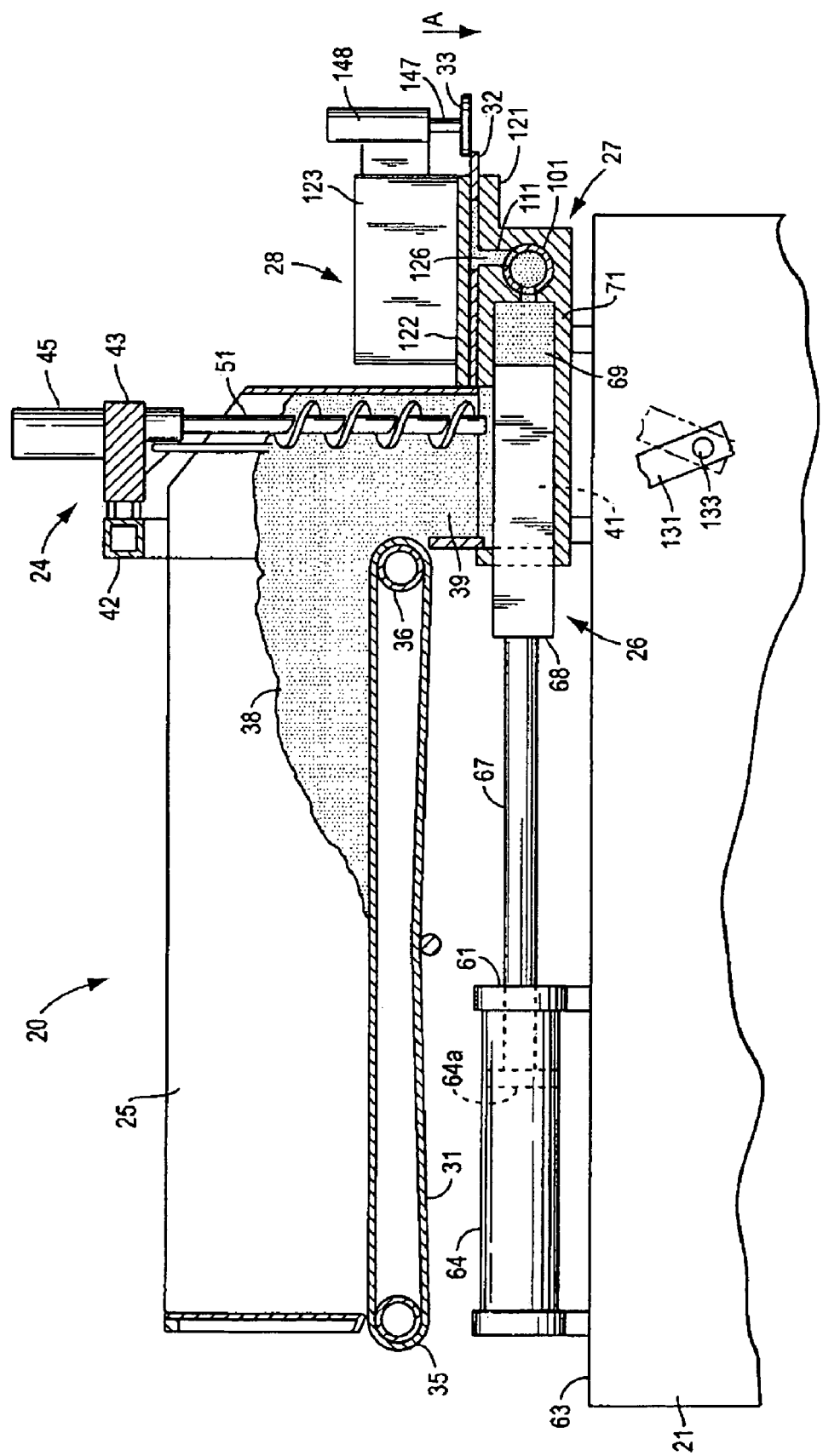
FIG. 1 is a schematical longitudinal cross-sectional view of a first patty-forming machine.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FORMAX® F-26™ Patty-Forming Machine

Figure 2:
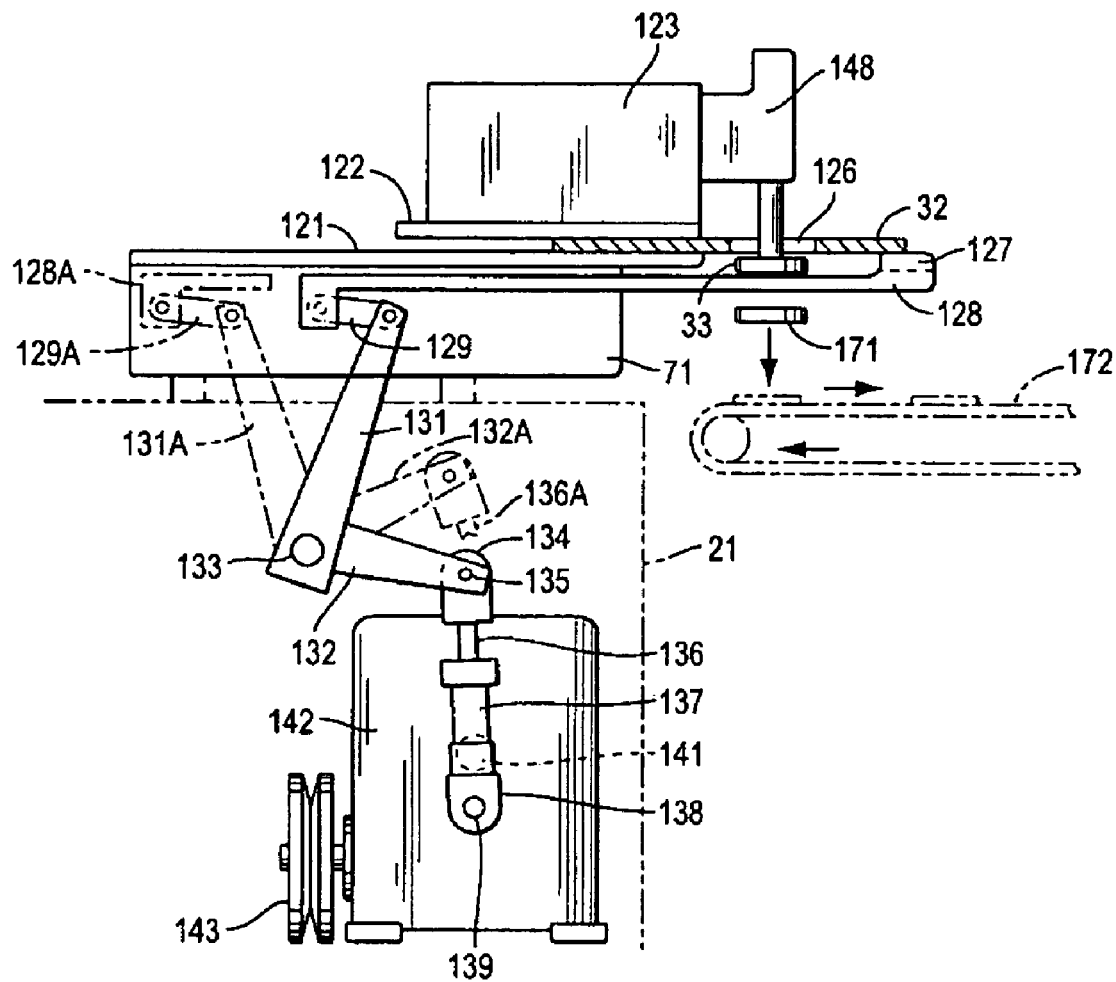
FIG. 2 is an enlarged sectional view taken from FIG. 1.

The high-speed food patty molding machine 20 illustrated in FIGS. 1 and 2 generally illustrates a FORMAX® F-26™ patty-forming machine, available from Formax, Inc. of Mokena, Ill., U.S. This application incorporates by reference U.S. Pat. Nos. RE30,096; 4,996,743; 4,356,595; 4,821,376 and 4,182,003 which describe in more detail what is substantially a FORMAX® F-26™ patty-forming machine including improved configurations and operating controls.

Molding machine 20 includes a machine base 21, preferably mounted upon a plurality of rollers or wheels. Machine base 21 supports the operating mechanism for machine 20, and contains hydraulic actuating systems, electrical actuating systems, and most of the machine controls.

Molding machine 20 includes a supply means 24 for supplying a moldable food material, such as ground beef, fish, or the like, to the processing mechanisms of the machine. Supply means 24 comprises a large food material storage hopper 25 that opens into the intake of a food pump system 26. The food pump system 26 includes two food pumps that continuously pump food, under pressure, into a manifold 27 connected to a cyclically operable molding mechanism 28.

In the operation of machine 20, a supply of ground meat or other moldable food material is dumped into hopper 25 from overhead. The floor of hopper 25 comprises a conveyor belt 31 for moving the food material longitudinally of the hopper toward the other components of the food material supply means 24.

At the forward end of hopper 25, the right hand end of the hopper as seen in FIG. 1, the food material is fed downwardly by supply means 24 into the intake of the reciprocating pumps constituting pumping system 26. The pumps of system 26 operate in overlapping alteration to each other; at any given time when machine 20 is in operation at least one of the pumps is forcing food material under pressure into the intake of manifold 27.

The manifold 27 comprises a valving system for feeding the food material, still under relatively high pressure, into the molding mechanism 28. Molding mechanism 28 operates on a cyclic basis, first sliding a multi-cavity mold plate 32 into receiving position over manifold 27 and then away from the manifold to a discharge position aligned with a series of knockout cups 33. When mold plate 32 is at its discharge position, knockout cups 33 are driven downwardly, discharging the hamburgers or other molded products from machine 20, as indicated by arrow A in FIG. 1.

The conveyor belt 31 extends completely across the bottom of hopper 25, around an end roller 35 and a drive roller 36. A chain drive is provided for drive roller 36, driven by an electric motor (not shown).

The forward end of hopper 25 communicates with a vertical pump feed opening 39 that leads downwardly into a pump intake chamber 41. A U-shaped frame 42 is mounted on machine base 21, extending over hopper 25 adjacent the left hand side of the hopper outlet 39. A mounting bracket 43 is affixed to the upper portion of frame 42, extending over the pump feed opening 39 in hopper 25.

Multiple electric feed screw motors 45 (one shown), are mounted upon bracket 43. Motor 45 drives a feed screw 51 that extends downwardly through opening 39 in alignment with a pump plunger 88.

When machine 20 is in operation, one or more of the feed screw motors are energized whenever one plunger is withdrawn to the left in FIG. 1, so that feed screws supply meat from hopper 25 downwardly through opening 39 and into one side of the intake 41 of the food pumping system 26. Similarly, one or more of the feed screw motors actuate feed screws to feed meat to the other side of intake 41 whenever the other plunger 68 is withdrawn. In each instance, the feed screw motors are timed to shut off shortly after the plunger is fully retracted, avoiding excessive agitation of the meat. As the supply of food material in the outlet 39 of hopper 25 is depleted, conveyor belt 31 continuously moves the food forwardly in the hopper and into position to be engaged by feed screws.

The food pump system 26 comprises two reciprocating food pumps 61 (one shown) mounted upon the top 63 of machine base 21. The first food pump 61 includes a hydraulic cylinder 64 having two ports. The piston 64a in cylinder 64 is connected to an elongated piston rod 67; the outer end of piston rod 67 is connected to a large plunger 68. Plunger 68 is aligned with a first pump cavity 69 formed by a pump cavity enclosure 71 that is divided into two chambers by a partial central divider wall 72. The forward wall 74 of pump cavity 69 has a relatively narrow slot that communicates with the pump manifold 27 as described more fully hereinafter. The second food pump is essentially similar in construction to pump 61.

The pump feed manifold 27, comprises a manifold valve cylinder 101 fitted into an opening in housing 71 immediately beyond the pump cavity walls. The valve cylinder is selectively rotatable to direct food product from either pump cavity to a slot 111 in housing 71 that constitutes a feed passage for molding mechanism 28.

The upper surface of the housing 71 that encloses the pump cavities and the manifold 27 comprises a support plate 121 that projects forwardly of the housing, and that affords a flat, smooth mold plate support surface. The mold plate support 121 may be fabricated as a separate plate bolted to or otherwise fixedly mounted upon housing 71. It includes the upper portion of the manifold outlet passage 111.

Mold plate 32 is supported upon plate 121. Mold plate 32 includes a plurality of individual mold cavities 126 extending across the width of the mold plate (See FIG. 5) and alignable with the manifold outlet passageway 111. A cover plate 122 is disposed immediately above mold plate 32, closing off the top of each of the mold cavities 126. A housing 123 is mounted upon cover plate 122. The spacing between cover plate 122 and support plate 121 is maintained equal to the thickness of mold plate 32 by support spacers 402, 404 (FIG. 5) mounted upon support plate 121; cover plate 122 rests upon spacers 402, 404, 406 when the molding mechanism is assembled for operation. Cover plate 122 is held in place by mounting bolts.

Mold plate 32 is connected to two spaced apart drive rods 128 via a drawbar 127. The drive rods 128 extend alongside housing 71 and are each connected at one end to a swing link 129. The other end of each link 129 is pivotally connected to a rocker arm 131 which, with a respective second arm 132, forms a crank pivoted on a fixed shaft 133. The free end of crank arm 132 is provided with a lost motion connection, entailing a pin 134 in an elongated slot 135, to a connecting rod assembly 136 that includes a hydraulic shock absorber 137. Shock absorber 137 is connected to a mold plate crank arm 138 having a crank pin 139 linked to the output shaft 141 of a gear reducer 142. Gear reducer 142 is driven through a variable speed drive, represented in FIG. 2 by a pulley 143, actuated by a mold plate drive motor (not shown).

Molding mechanism 28 further comprises a knockout apparatus. The knockout apparatus comprises the knockout cups 33, which are affixed to a mechanism within the housing 123 that is driven by the machine motor via chains and sprockets. The details of the knockout mechanism can be found in U.S. Pat. RE30,096, herein incorporated by reference. The mechanism reciprocates the knockout cups in synchronism with the movement of the mold plate. Knockout cups 33 are coordinated in number and size to the mold cavities 126 in mold plate 32; there is one knockout cup 33 aligned with each mold cavity 126 and the mold cavity size is somewhat greater than the size of an individual knockout cup.

FORMAX® MAXUM700® Patty-Forming Machine

Figure 3:
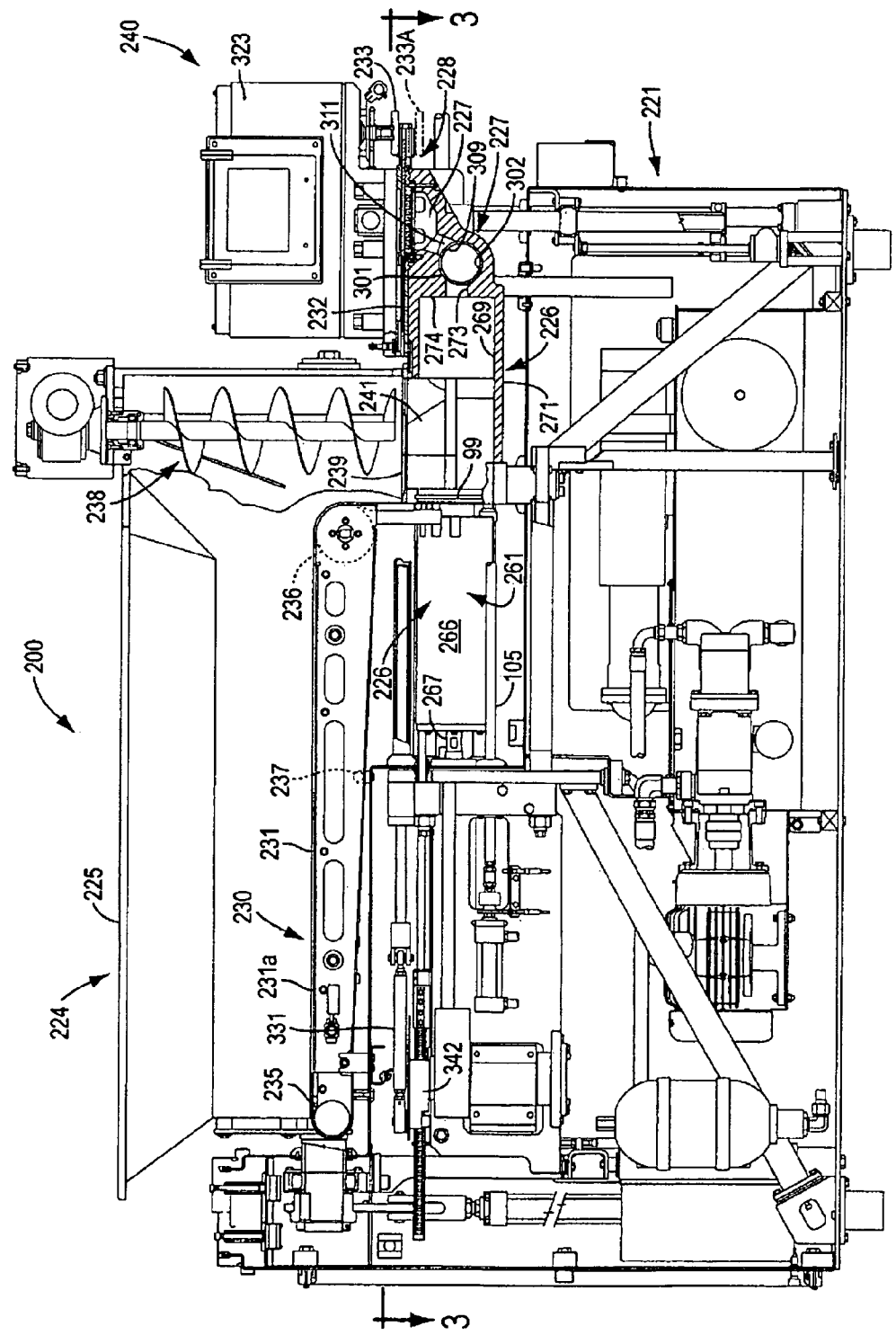
FIG. 3 is a schematical longitudinal cross-sectional view of a second patty-forming machine.
Figure 4:
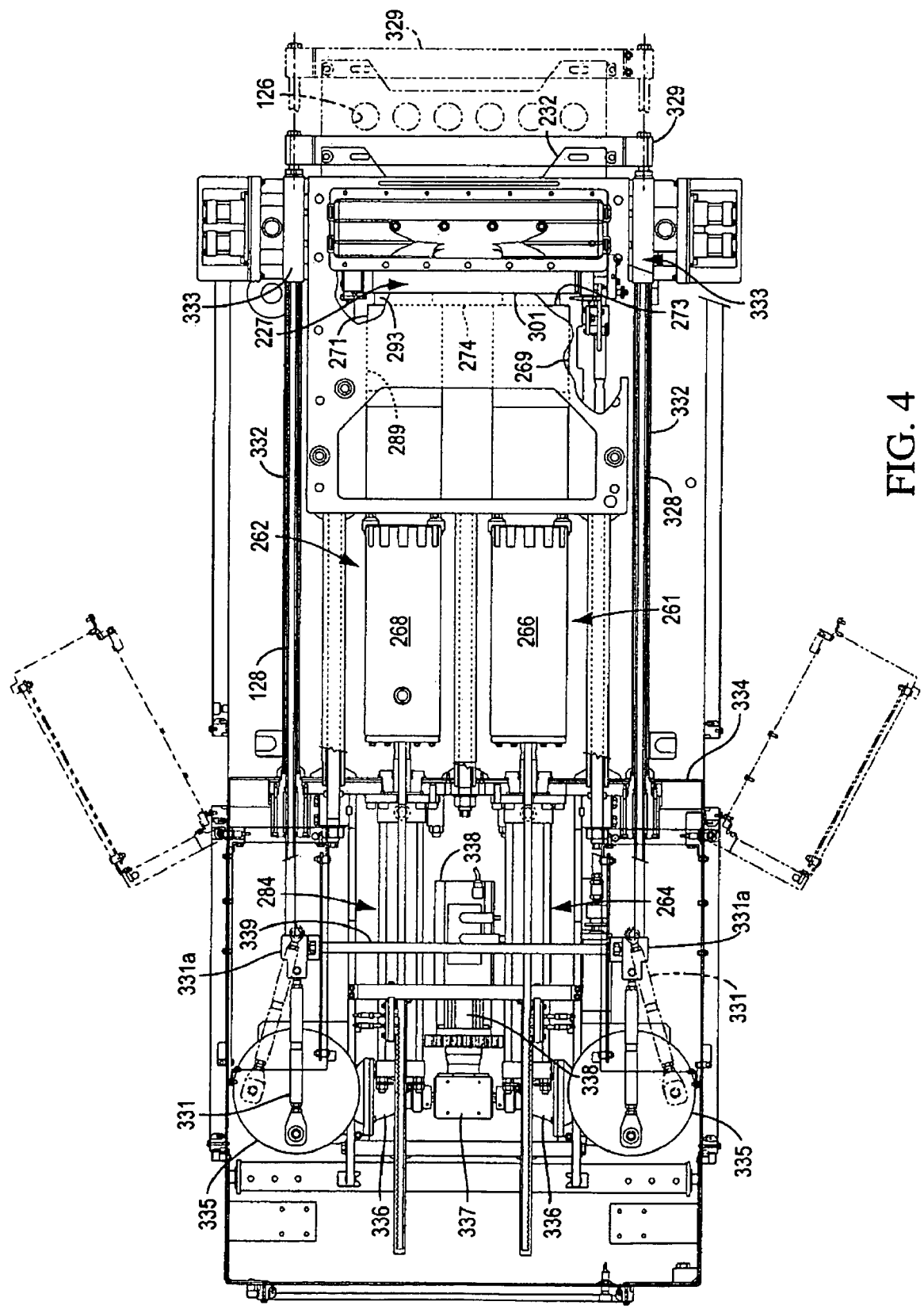
FIG. 4 is a sectional view taken generally along line 4-4 of FIG. 3.

The high-speed food patty molding machine 200 illustrated in FIGS. 3-4 substantially illustrates a FORMAX® MAXUM700® patty-forming machine. This application incorporates by reference published U.S. patent application 2005/0092187, U.S. Ser. No. 10/942,627 filed Sep. 16, 2004, herein incorporated by reference, which describes in more detail what is substantially a FORMAX® MAXUM700® patty-forming machine.

Molding machine 200 includes a machine base 221 which supports the operating mechanisms of the machine and contains hydraulic actuating systems, electrical actuating systems, and most of the machine controls.

The food patty molding machine 200 includes a supply mechanism 224 for storing and supplying a moldable food product, such as ground beef, fish, pork, chicken, potatoes, or the like, to the processing mechanisms of the machine. Supply means 224 includes a large food product storage hopper 225 that supplies food product to a food pump system 226. System 226 includes two food pumps operating in alternation; other machines typically include only a single food pump. The two food pumps continuously pump food, under pressure, into a valve manifold 227 connected to a cyclically operable molding station 228.

Molding station 228 includes a mold plate 232 that moves cyclically between a fill position, shown in FIG. 3 and a discharge position in which its mold cavities are outside of station 228, within a knockout station 240 aligned with a set of knock-out cups 233. Details of the knockout mechanism can be found in U.S. Ser. No. 10/942,627 filed Sep. 16, 2004, herein incorporated by reference.

Food supply means 224 includes a conveyor belt 231 that extends completely across the bottom of hopper 225. The forward end of hopper 225 communicates with a vertical hopper outlet 239 that leads downwardly into two pump chambers; only one pump chamber 241 is shown. One or more feed screws 238 are driven in rotation to deliver food product through the outlet 239 to the pump chamber 241. The conveyor belt 231 is driven in circulation to deliver food product in the hopper 225 to the feed screw 238.

As illustrated in FIG. 4, the food pump system 226 comprises two reciprocating food pumps 261, 262. Food pumps 261, 262 are driven by hydraulic cylinders 264, 284, respectively. The piston in each cylinder is connected to a piston rod that is in turn connected to a large pump plunger 266, 268 respectively. The respective plunger 266, 268 is aligned with and extends into a pump cavity 269, 289, which is substantially enclosed by a housing 271. The forward wall 274 of each pump cavity 269, 289 includes a respective slot 273, 293 that communicates with the valve manifold 227.

Figure 3A:
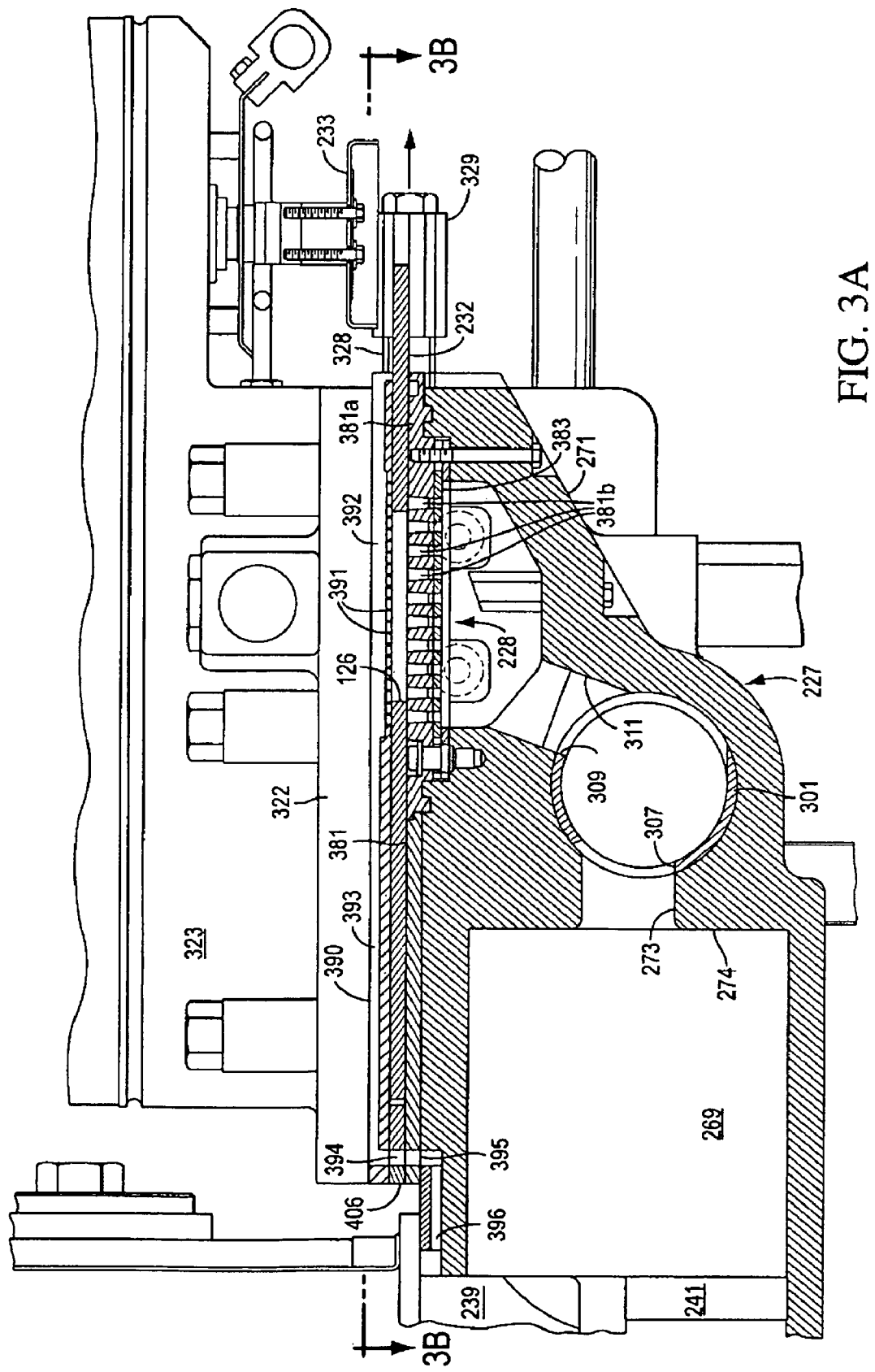
FIG. 3A is a enlarged, fragmentary longitudinal cross-sectional view taken from FIG. 3.

As shown in FIG. 3A, valve feed manifold 227 includes a valve cylinder 301 fitted into an opening in housing 271 immediately beyond wall 274. Valve cylinder 301 includes two intake slots 307, 308. One slot 307, 308 is alignable with a corresponding outlet slot 273, 293 in pump cavity wall 274, depending on which pump 261, 262 is in use. Rotation of cylinder 301 is effective to move one slot 307, 308 into alignment and one slot 307, 308 out of alignment with corresponding slots 273, 293 depending on which pump is in operation and which is being refilled. Valve cylinder 301 also includes outlet slots 309 aligned with a slot 311 in housing 271 that comprises a fill passage for the molding station 228.

Figure 3B:
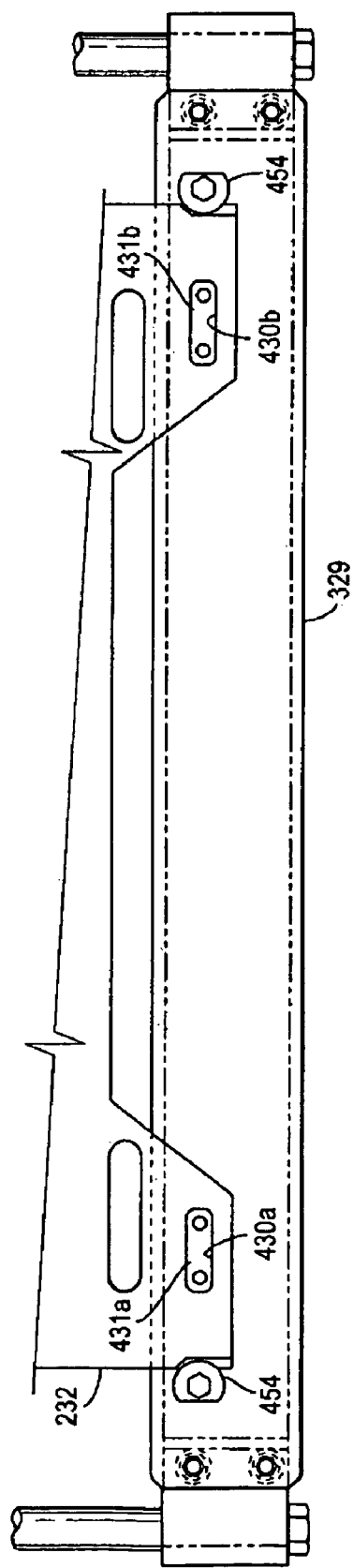
FIG. 3B is a enlarged, fragmentary cross-sectional view taken generally along line 3B-3B in FIG. 3A.

As best illustrated in FIGS. 3B and 4, mold plate 232 is connected to a drawbar 329 that is connected to drive rods 328 that extend alongside housing 271. The mold plate 232 includes oblong keyholes 430a, 430b (FIG. 6) that receive oblong keys 431a, 431b that are fastened to the drawbar 329 from below the drawbar 329 by two fasteners threaded into threaded holes in the keys 431a, 431b. The other end of each drive rod 328 is pivotally connected to a connecting link 331 via a coupling plate 331a and a pivot connection. The connecting link 331 is shown in two positions (one solid, one dashed).

Each drive rod 328 is carried within a guide tube 332 that is fixed between a wall 334 and a front bearing housing 333. The connecting links 331 are each pivotally connected to a crank arm 342 (FIG. 3). The crank arm 342 is fixed to, and rotates with, a circular guard plate 335.

The crank arms 342 are each driven by a right angle gear box 336 via a "T" gear box 337 having one input that is driven by a precise position controlled motor 338 such as a servomotor, and two outputs connected to the gearboxes 336. The "T" gear box 337 and the right angle gear boxes 336 are configured such that the crank arms 342 rotate in opposite directions at the same rotary speed.

A tie bar 339 is connected between the rods 328 to ensure a parallel reciprocation of the rods 328. As the crank arms 342 rotate in opposite rotational directions, the outward centrifugal force caused by the rotation of the crank arms 342 and the eccentric weight of the attached links 331 cancels, and separation force is taken up by tension in the tie bar 339.

During most of each cycle of operation of mold plate 232, the knockout mechanism remains in the elevated position, with knockout cups 233 clear of mold plate 232. When mold plate 232 reaches its extended discharge position the knockout cups 233 are driven downward to discharge the patties from the mold cavities.

FIG. 3A illustrates the upper surface of the housing 271 that encloses the pump cavities and the manifold 227 comprises a support plate 381 that affords a flat, smooth mold plate support surface. The mold plate support 381 may be fabricated as a separate plate bolted to or otherwise fixedly mounted upon housing 271. It includes the upper portion of the manifold outlet passage 311.

Preferably a separate fill plate 381a is fixed to the manifold housing 271. The fill plate 381a includes a plurality of openings 381b for passing food product into the mold cavities 126. A reciprocal stripper or seal-off plate 383 is sliding carried by the fill plate 381a. The function, configuration and structure of the fill plate and stripper and seal-off plate is described in U.S. Pat. No. 4,821,376, herein incorporated by reference.

Mold plate 232 is supported upon plate 381 and 381a. Mold plate 232 includes a plurality of individual mold cavities 126 extending across the width of the mold plate (See FIG. 6) and alignable with the manifold outlet passageway 311. Cover plate 122 is held in place by mounting bolts.

A breather plate 390 can be arranged above the mold plate 232 closing off the top of each of the mold cavities 126. The spacing between the breather plate 390 and support plate 121 is maintained equal to the thickness of mold plate 232 by support spacers 402, 404, 406 (FIG. 6) mounted upon support plate 381. The breather plate 390 includes air apertures 391 that communicate air into passages 392, 393, 394, 395 and 396 into the opening 239 and pump cavity 241. The passages 394 are through the rear spacer 406.

A cover plate 322 is disposed above the breather plate 390. A housing 323 which contains the knockout mechanism is mounted upon cover plate 322.

FORMAX® F-26™ Mold Plate and FORMAX® MAXUM700® Mold Plate

Figure 5:
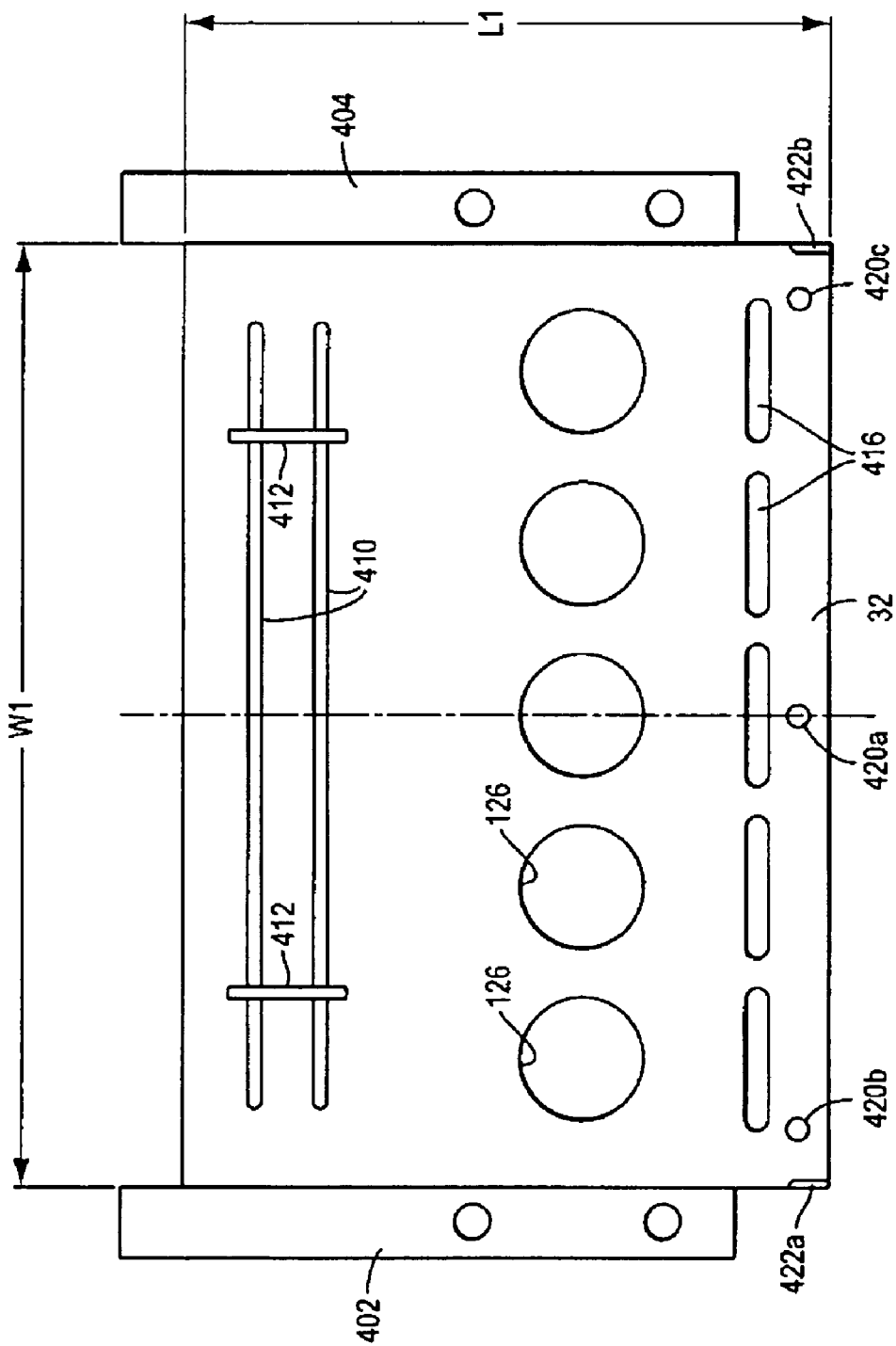
FIG. 5 is a plan view of a first mold plate and associated spacers usable with the first patty-forming machine of FIGS. 1 and 2.

FIG. 5 illustrates the mold plate 32 used in the forming machine 20 of FIGS. 1 and 2. Additionally, side spacers 402, 404 and rear spacer 406 are shown. The mold plate 32 is of conventional design for use in a FORMAX® F-26™ reciprocating mold plate patty forming machine. The mold plate 32 includes the mold cavities 126, food product pressure balance grooves 410 opened to pressure balance slots 412, and food particle drop slots 416. To mount the mold plate 32 to a drawbar, three cylindrical key holes are provided through the mold plate 32: a center keyhole 420a, a left keyhole 420b and a right keyhole 420c. Additionally, a left corner recess 422a and a right corner recess 422b are provided. A conventional F-26™ mold plate has a width W1 equal to about 27 inches and a length L1 equal to about 19.5 inches.

Figure 6:
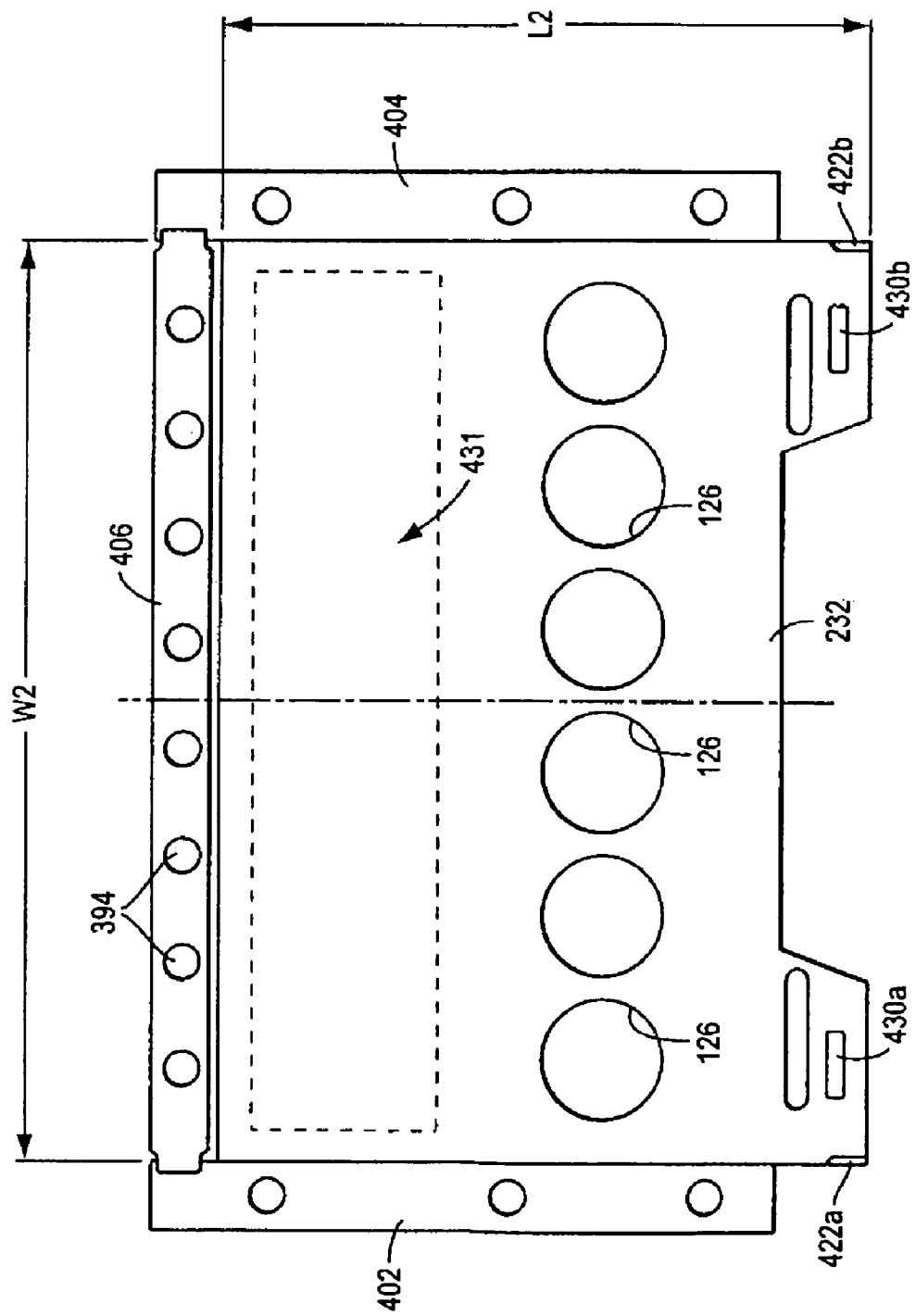
FIG. 6 is a plan view of a second mold plate and associated spacers usable with the second patty-forming machine of FIGS. 3 and 4.

FIG. 6 illustrates the mold plate 232 used in the forming machine 200 of FIGS. 3-4. Similar components or configurations to the arrangement in FIG. 5 are given the same reference number even though the components may be of different size in practice. The mold plate 232 is of typical design for use in a FORMAX® MAXUM700® reciprocating mold plate patty forming machine. The area marked 431 provides slots and grooves configured as described in U.S. Provisional Application No. 60/844,789, filed Sep. 15, 2006. Alternately the mold plate, the breather plate and spacers can be as described in U.S. patent application 2005/0092187, U.S. Ser. No. 10/942,627 filed Sep. 16, 2004, both herein incorporated by reference. To mount the mold plate 32 to a drawbar, two oblong or rounded rectangular keyholes: a left keyhole 430a and a right keyhole 430b are provided through the mold plate 232. Additionally, the left corner recess 422a and the right corner recess 422b are provided. A conventional MAXUM700® mold plate has a width W2 equal to about 28.5 inches and a length L2 equal to about 20.375 inches.

Using FORMAX® F-26™ Mold Plate on a FORMAX® MAXUM700® Machine

As stated in the background of the invention, the present inventors have recognized that it would be advantageous to be able to mount an FORMAX® F-26™ mold plate onto a FORMAX® MAXUM700® patty forming machine.

Figure 15:
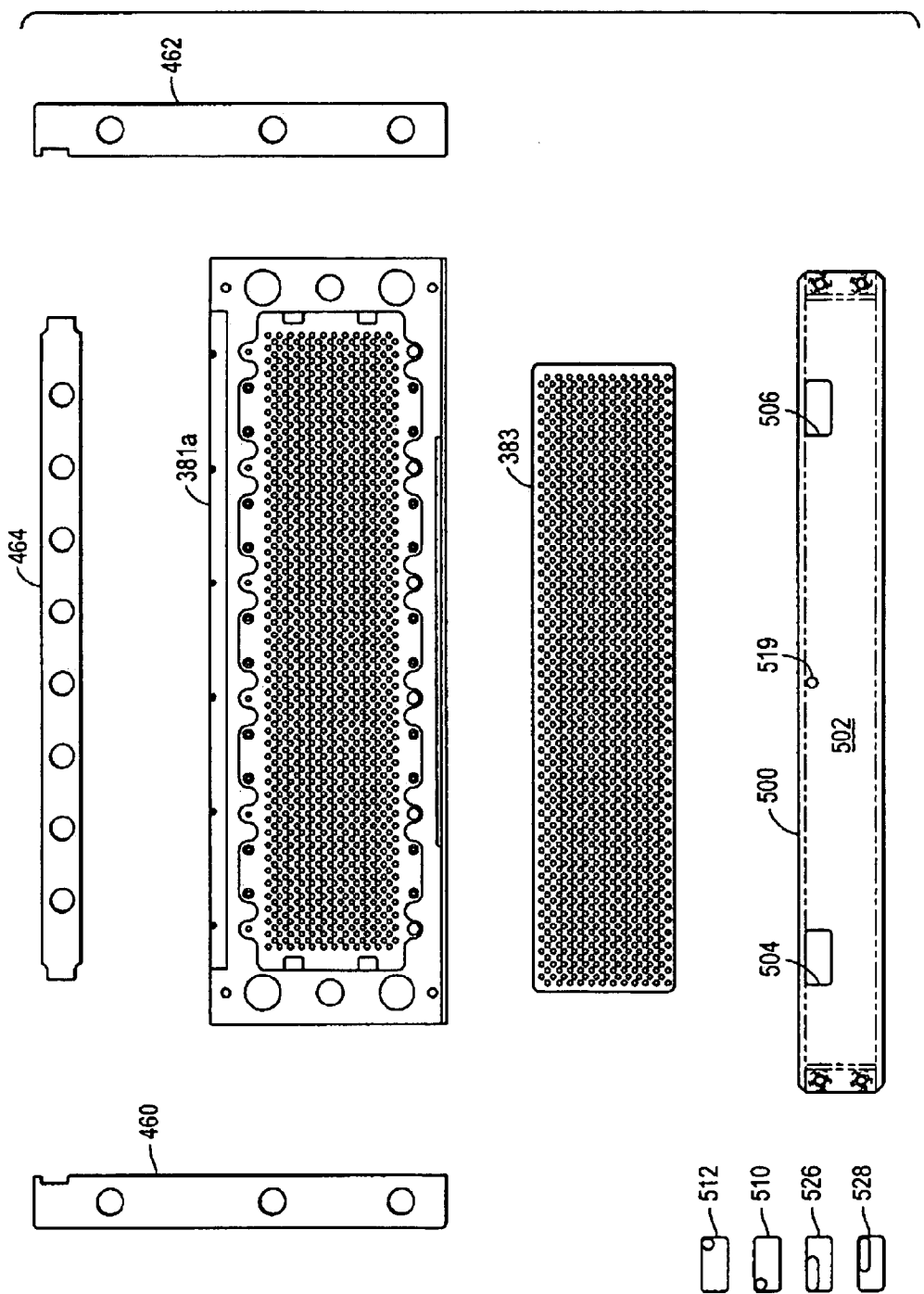
FIG. 15 is an exploded plan view of tooling used to convert a MAXUM700® machine to mount an F-26™ mold plate according to the fourth system of FIG. 10.

One system of providing this compatibility is illustrated in FIG. 7. According to this embodiment, a new drawbar 450 set up to be mounted in a FORMAX® MAXUM700® machine includes lock cams set inward to correspond to the width W1 of the F-26™ mold plate. Furthermore, the drawbar 450 includes cylindrical pins 456a, 456b, 456c that fit within the cylindrical keyholes through the mold plate 32, keyholes 420a, 420b, 420c, respectively. Wider side spacers 460, 462 and a wider end spacer 464 (see FIG. 15) would also be required due to the smaller dimensions of the F-26™ mold plate. If a perforated fill plate and seal off stripper are used, replacement fill plates and seal off stripper plates to accommodate the different mold cavity number and pattern, may also be required.

Two cam locks 454 are used to hold the mold plate 32 to the drawbar 450. To mount or remove a mold plate the cams are turned with flat sides inward. To lock down a mold plate to the drawbar, the cam locks are tuned to overlie the recesses. A friction washer prevents the cam locks from turning once in locked position.

One drawback to this method is that a different drawbar would be needed to thereafter re-mount a FORMAX® MAXUM700® mold plate to this FORMAX® MAXUM700® forming machine. In effect, an F-26™ mold plate compatible-drawbar and a FORMAX® MAXUM700® mold plate-compatible drawbar would be required to run both types of mold plates on this FORMAX® MAXUM700® machine.

Another method of providing this compatibility is illustrated in FIG. 8. According to this system, the mold plate 32 is modified to include a left oblong keyhole 466a and a right oblong keyhole 466b for receiving a left oblong key 468a and a right oblong key 468b that are fastened to a drawbar 470 by screws that extend from a bottom side of the drawbar 470. The oblong keys 468a, 468b provide sufficient shear strength of the connection between the mold plate 32 and the drawbar 470. The key holes 420a, 420b, 420c are retained for the purpose of reusing the mold plate 32 in an FORMAX® F-26™ molding machine. The oblong keyholes 466a, 466b and the oblong keys 468a, 468b cannot be located in the correct position to also mount a mold plate 232 according to this embodiment if the keyholes 420a, 420b, 420c are to be retained. Therefore, according to this system a designated drawbar must be used for the mold plate 32 which is incompatible with mounting the mold plate 232.

Wider side spacers 460, 462 and a wider end spacer 464 (see FIG. 15) would also be required due to the smaller dimensions of the F-26™ mold plate. If a perforated fill plate and seal off stripper are used, replacement fill plates and seal off stripper plates to accommodate the different mold cavity number and pattern, may also be required.

Two cam locks 454 are used to hold the mold plate 32 to the drawbar 470. To mount or remove a mold plate the cams are turned with flat sides inward. To lock down a mold plate to the drawbar, the cam locks are tuned to overlie the recesses. A friction washer prevents the cam locks from turning once in locked position.

Figure 9:
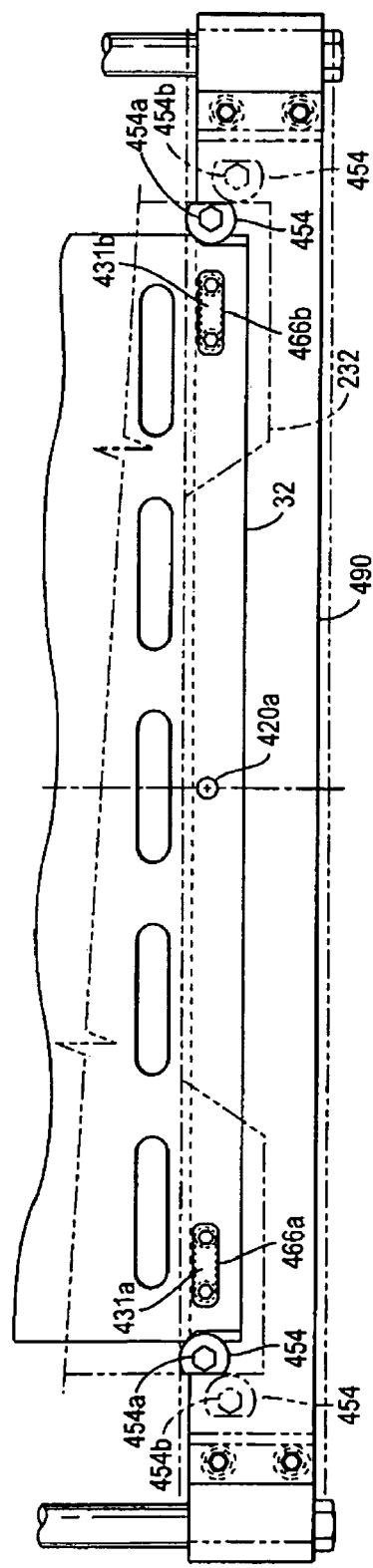
FIG. 9 is a plan view of a third system for converting a first mold plate to be usable with the second patty-forming machine of FIGS. 3-4.

Another method for providing this compatibility is shown in FIG. 9. According to this system, the mold plate 32 is modified wherein oblong key holes 466a, 466b are cut through the mold plate 32 at the same positions as required for the mounting of the mold plate 232 on the keys 431a, 431b (FIG. 3B). According to this system, either the mold plate 32 or the mold plate 232 can be mounted to a common drawbar 490 that has oblong keys 431a, 431b fastened thereto and inserted into either the oblong keyholes 466a, 466b of the mold plate 32 or the oblong key holes 430a, 430b of the mold plate 232 (FIG. 6). A drawback of the system is that once the mold plate 32 is so modified, it cannot be re-installed into an F-26™ machine.

Wider side spacers 460, 462 and a wider end spacer 464 (see FIG. 15) would also be required due to the smaller dimensions of the F-26™ mold plate. If a perforated fill plate and seal off stripper are used, replacement fill plates and seal off stripper plates to accommodate the different mold cavity number and pattern, may also be required.

Two cam locks 454 are used to hold the mold plate 32 to the drawbar 490. To mount or remove a mold plate the cams are turned with flat sides inward. To lock down a mold plate to the drawbar, the cam locks are tuned to overlie the recesses. A friction washer prevents the cam locks from turning once in locked position. When the wider mold plate 232 is used, the cam locks 454 are relocated to a wider position to accommodate the wider mold plate 232. In this regard, four holes are provided in the drawbar 490 for the installation of the cam locks in the desired position, two inner holes 454a, 454a and two outer holes 454b, 454b.

Figure 10:
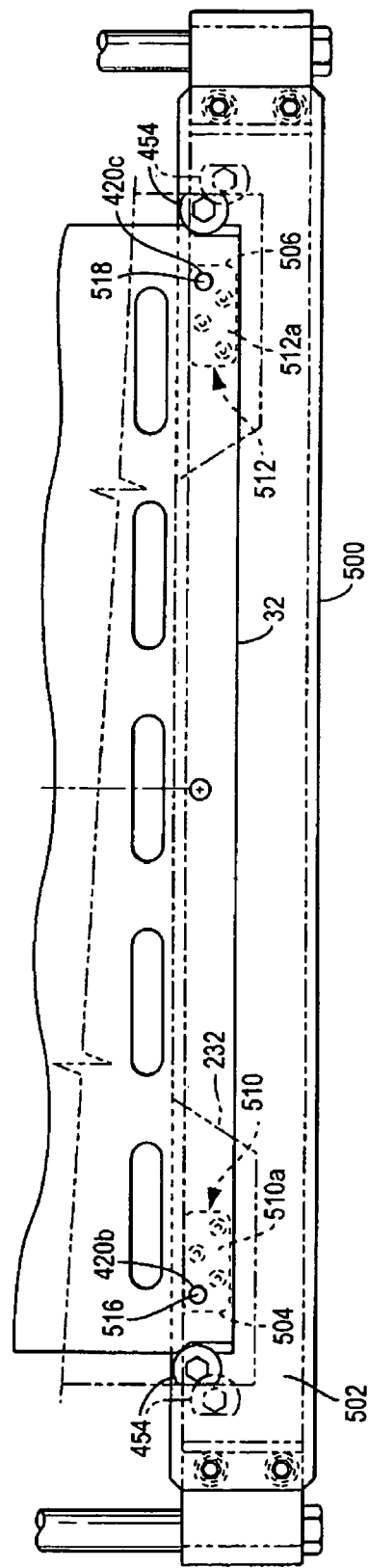
FIG. 10 is a plan view of a fourth system for converting a first mold plate to be usable with the second patty-forming machine of FIGS. 3-4.

A further method of providing this compatibility is described in FIG. 10. According to this system a common drawbar 500 can be used for both mold plate 32, and mold plate 232. According to this embodiment the drawbar 500 is provided with a flat top surface 502 with rectangular recesses 504, 506. To mount the mold plate 32, a first set of adapters is installed. A left adapter 510 and a right adapter 512 include respective rounded rectangular adapter bases 510a, 510b that are fit snugly within the recesses 504, 506. The adapter bases 510a, 512a are fastened to the drawbar 500 using fasteners which extend from a bottom surface of the drawbar 500 into threaded holes into the adapter bases 510a, 512a open on a bottom of each adapter base. In the illustrated embodiment, the adapter includes threaded holes for four (one being aligned with the pin) fasteners.

Key pins 516, 518 extend upwardly from each respective adapter base 510a, 512a. The recess and adapter are configured such that the key pins extend in registry with the mold plate keyholes 420b, 420c. A fixed key pin 519 on the drawbar fits into the keyhole 420a. The key pin 519 is preferably attached with a screw from below or can be formed with, machined into, welded to, fastened to, or otherwise connected to the drawbar 500.

Each adapter 510, 512, including the adapter base and key pin, comprises a machined, unitary body, preferably composed of 17-4 stainless steel.

Figure 11:
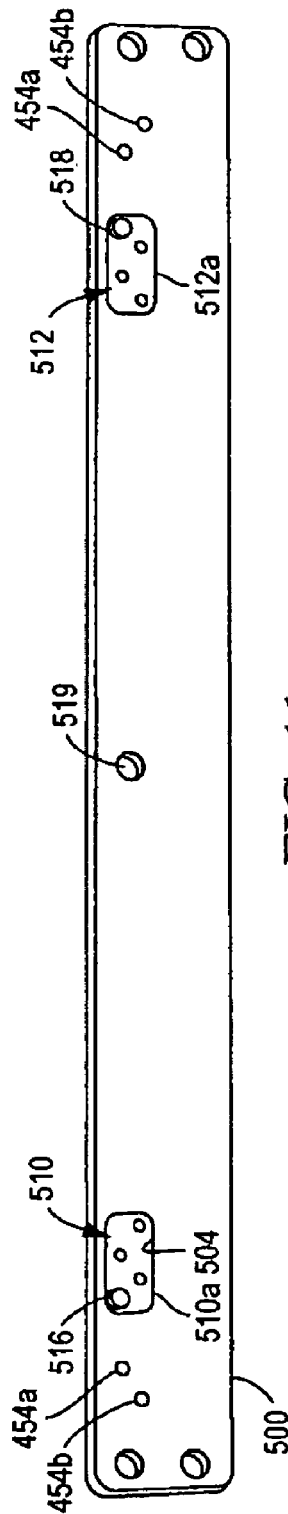
FIG. 11 is a perspective view of a drawbar according to the fourth system of FIG. 10 set up to mount an F-26™ mold plate.

Two cam locks 454 are used to hold the mold plate 32 to the drawbar 500. To mount or remove a mold plate the cams are turned with flat sides inward. To lock down a mold plate to the drawbar, the cam locks are tuned to overlie the recesses. A friction washer prevents the cam locks from turning once in locked position. When the wider mold plate 232 is used, the cam locks 454 are relocated to a wider position to accommodate the wider mold plate 232. In this regard, four holes are provided in the drawbar 500 for the installation of the cam locks in the desired position, two inner holes 454a, 454a and two outer holes 454b, 454b (see FIG. 11).

Figure 12:
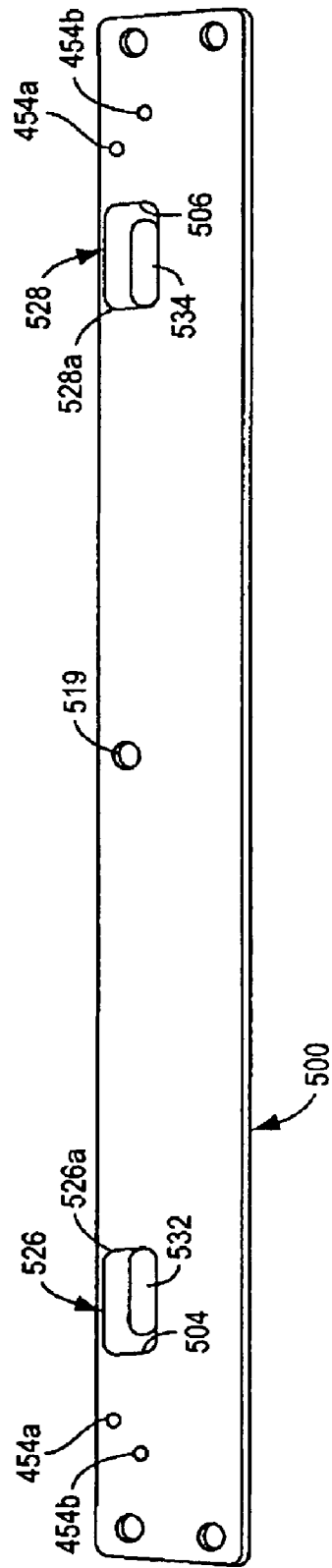
FIG. 12 is a perspective view of a drawbar according to the fourth system of FIG. 10 set up to mount a MAXUM700® mold plate.
Figure 13:
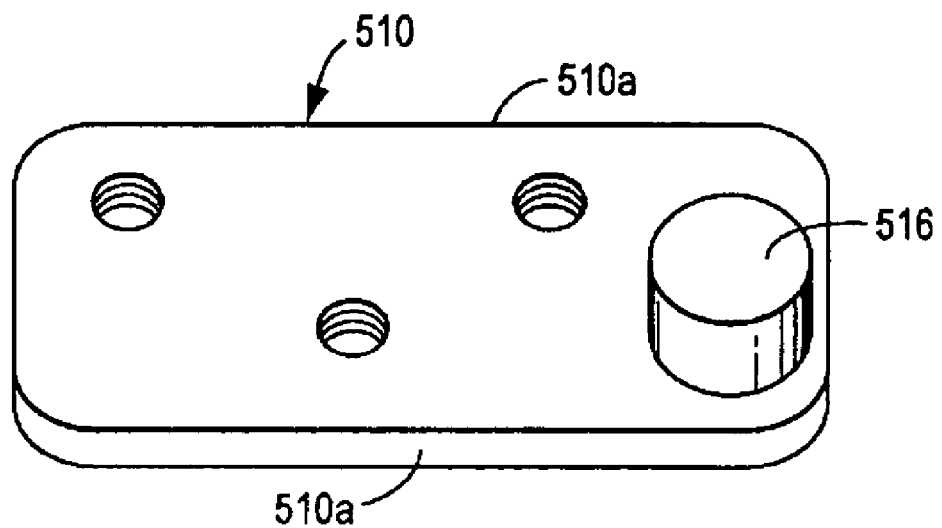
FIG. 13 is a perspective view of one adapter used in the set up of FIG. 11.
Figure 14:
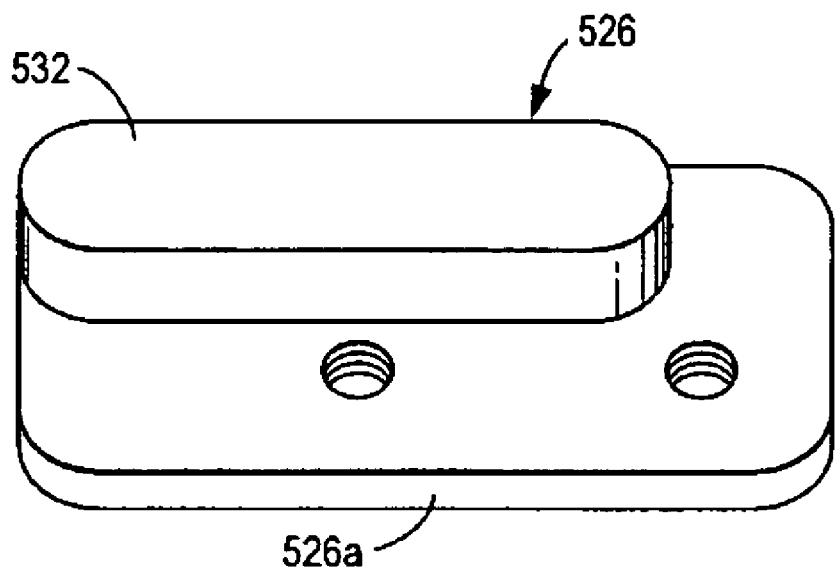
FIG. 14 is a perspective view of one adapter used in the set up of FIG. 12.

The system shown in FIG. 10 also includes provision for mounting the wider mold plate 232. As shown in FIG. 12, a second, different set of adapters, a left adapter 526 and a right adapter 528 are fit snugly within the recesses 504, 506, respectively. Each of the adapters 526, 528 includes a rounded rectangular adapter base 526a, 528a, respectively. An oblong key 532, 534 extends from each base 526a, 528a. The adapter bases 526a, 528a are fastened to the drawbar 500 using fasteners which extend from a bottom surface of the drawbar 500 into threaded holes into the adapter bases 526a, 528a open on a bottom of each adapter base. In the illustrated embodiment, the adapter includes threaded holes for three fasteners.

The oblong keys 532, 534 are located on the respective bases 526a, 528a in order to be in registry with the oblong keyholes 430a, 430b of the mold plate 232 when the mold plate 232 is mounted to the drawbar 500.

The center fixed key pin 519 may remain in most cases but is not used for mounting the mold plate 232. Preferably, it is fastened in place and can be removed if necessary. Due to the shape of the mold plate 232, the key pin 519 may not interfere with the mounting of the mold plate 232.

Each adapter 526, 528, including the adapter base and oblong key comprises a machined, unitary body, preferably composed of 17-4 stainless steel.

The drawbars illustrated above are preferably composed of 17-4 stainless steel. The spacers 460, 462, 464 are preferably composed of mild steel or 300 series stainless steel.

According to this embodiment, by the use of selective adapters 510, 512, 526, 528, a common drawbar can be used for both mold plates 32, 232 on a FORMAX® MAXUM700® machine. For setting up a FORMAX® MAXUM700® machine to use an FORMAX® F-26™ mold plate 32, the tooling shown in FIG. 15 may be needed. The tooling includes the drawbar 500, a narrower fill plate 381a, a narrower stripper or seal off plate 383, wider spacers 460, 462, 464 to compensate for the narrower mold plate 32, and the adapters 510, 512. The adapters 526, 528 are used to return the tooling to a condition to mount a FORMAX® MAXUM700® mold plate 232 on the FORMAX® MAXUM700® machine.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A system for mounting a first mold plate from a first reciprocating mold plate patty-forming machine to a different, second reciprocating mold plate patty-forming machine, wherein said first patty-forming machine comprises a first drive system comprising a set of first driving rods that extend longitudinally and a first drawbar having provision for connection at opposite ends to said first driving rods of said first drive system, and wherein said second patty-forming machine comprises a second drive system comprising a set of second driving rods that extend longitudinally and a second drawbar having provision for connection at opposite ends to said second driving rods of said second drive system, the system comprising:

a first mold plate having a first configuration of keyholes located on said first mold plate corresponding to a configuration of keys located on said first drawbar of said first patty-forming machine;

a second mold plate having a wider width than said first mold plate and having a different configuration of keyholes located on said second mold plate corresponding to a configuration of keys located on said second drawbar of said second patty-forming machine; and a securing mechanism allowing said first mold plate to be secured onto said second drawbar of said second patty-forming machine.

2. The system according to claim 1 wherein said second drawbar is sized to fit said second patty-forming machine but has a configuration of keys corresponding to said keyholes of said first mold plate.

3. The system according to claim 2 wherein said securing mechanism comprises cam locks tightened to hold the first mold plate on the second drawbar.

4. The system according to claim 3 wherein said securing mechanism further comprises spacers sized and configured to be placed on opposite sides of the first mold plate in said second patty-forming machine to compensate for said first mold plate having a smaller width than said second mold plate.

5. The system according to claim 1 wherein said first mold plate is modified to contain keyholes that are oblong in shape, thereby strengthening the connection to said second drawbar, while also maintaining the original holes so said modified first mold plate is still compatible with said first drawbar of said first patty-forming machine.

6. The system according to claim 5 wherein said modified first mold plate is attached to said second drawbar with keys corresponding to said oblong holes in said first mold plate.

7. The system according to claim 5 wherein said securing mechanism comprises cam locks tightened to hold the first mold plate on the second drawbar.

8. The system according to claim 7 wherein said securing mechanism further comprises spacers sized and configured to be placed on opposite sides of the first mold plate in said second patty-forming machine to compensate for said first mold plate having a smaller width than said second mold plate.

9. The system according to claim 1 wherein said first mold plate is modified to comprise keyholes corresponding to said keys configured on said drawbar of said second patty-forming machine.

10. The system according to claim 9 wherein said securing mechanism comprises cam locks tightened to hold the first mold plate on the second drawbar.

11. The system according to claim 10 wherein said securing mechanism further comprises spacers sized and configured to be placed on opposite sides of the first mold plate in said second patty-forming machine to compensate for said first mold plate having a smaller width than said second mold plate.

12. The system according to claim 1 comprising a plurality of adapters, wherein said drawbar of said second patty-forming machine comprises a plurality of recesses sized and configured to receive said plurality of adapters;

said adapters comprising different configurations of keys corresponding to differences in configurations of said keyholes in said first and second mold plates.

13. The system according to claim 12 wherein said securing mechanism comprises cam locks tightened to hold the first mold plate on the second drawbar.

14. The system according to claim 13 wherein said securing mechanism further comprises spacers sized and configured to be placed on opposite sides of the first mold plate in said second patty-forming machine to compensate for said first mold plate having a smaller width than said second mold plate.

* * * * *